United States Patent
Seong

(10) Patent No.: US 9,515,343 B2
(45) Date of Patent: Dec. 6, 2016

(54) RECHARGEABLE BATTERY

(71) Applicant: SAMSUNG SDI CO., LTD., Yongin-si (KR)

(72) Inventor: Jae-Il Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 63 days.

(21) Appl. No.: 14/466,864

(22) Filed: Aug. 22, 2014

(65) Prior Publication Data

US 2015/0140416 A1 May 21, 2015

(30) Foreign Application Priority Data

Nov. 20, 2013 (KR) .................. 10-2013-0141632

(51) Int. Cl.
*H01M 8/1067* (2016.01)
*H01M 8/1062* (2016.01)
*H01M 8/10* (2016.01)

(52) U.S. Cl.
CPC ......... *H01M 8/1067* (2013.01); *H01M 8/1062* (2013.01); *Y02E 60/521* (2013.01)

(58) Field of Classification Search
CPC .... H01M 8/1067; H01M 8/1062; H01M 2/00; H01M 2/02; H01M 2/025; H01M 10/02; H01M 10/058; H01M 10/12; H01M 2002/0205
See application file for complete search history.

(56) References Cited

U.S. PATENT DOCUMENTS

| 3,816,230 A * | 6/1974 | Carreras et al. ......... B32B 15/08 161/89 |
| 6,020,086 A | 2/2000 | Van Lerberghe |
| 6,528,203 B1 * | 3/2003 | Mitamura ............. H01M 10/46 429/98 |
| 2007/0292753 A1 * | 12/2007 | Zama et al. ...... H01M 10/0525 129/181 |

FOREIGN PATENT DOCUMENTS

| CN | 102610860 | * 7/2012 | ........... B23B 15/085 |
| EP | 0 928 035 A1 | 7/1999 | |

(Continued)

OTHER PUBLICATIONS

Office Action issued on Sep. 30, 2014 for Korean Patent Application No. 10-2013-0141632.

(Continued)

*Primary Examiner* — Patrick Ryan
*Assistant Examiner* — Aaron Greso
(74) *Attorney, Agent, or Firm* — Knobbe Martens Olson & Bear LLP

(57) ABSTRACT

An exemplary embodiment provides a rechargeable battery maintaining a bent state of a case by minimizing a deformation of the case of the bent state. A rechargeable battery according to an exemplary embodiment includes an electrode assembly; a case receiving the electrode assembly; a cap plate sealing an opening of the case; and an electrode terminal installed to the cap plate and electrically connected to the electrode assembly, wherein the case includes a first curved surface portion bent toward a center of the electrode assembly and a second curved surface portion bent to be far from the center, and a reinforcing member adhered to the first curved surface portion.

20 Claims, 14 Drawing Sheets

(56) References Cited

FOREIGN PATENT DOCUMENTS

| | | | |
|---|---|---|---|
| JP | 11-273709 A | | 10/1999 |
| JP | 2003-123706 | | 4/2003 |
| JP | 2004-142302 | * | 5/2004 ........... B32B 15/085 |
| JP | 2005-203169 | | 7/2005 |
| KR | 10-1999-0022813 | | 3/1999 |
| KR | 10-2006-0103693 A | | 10/2006 |
| KR | 10-2007-0093171 A | | 9/2007 |
| KR | 10-2008-0087959 | | 10/2008 |
| KR | 10-2009-0099273 A | | 9/2009 |
| KR | 10-2011-0073405 A | | 6/2011 |
| KR | 10-2013-0119556 | | 11/2013 |

OTHER PUBLICATIONS

KIPO Decision of Rejection dated May 27, 2015 in Korean Application 10-2013-0141632.
Korean Office Action issued on Sep. 14, 2015 in Korean Patent Application 10-2015-0091259.

* cited by examiner

RECHARGEABLE BATTERY

RELATED APPLICATIONS

This application claims priority to and the benefit of Korean Patent Application No. 10-2013-0141632 filed in the Korean Intellectual Property Office on Nov. 20, 2013, the entire contents of which are incorporated herein by reference.

BACKGROUND

Field

The described technology relates generally to a rechargeable battery having a curved case.

Description of the Related Technology

A rechargeable battery is a battery that is repeatedly charged and discharged, unlike a primary battery. Low-capacity rechargeable batteries are used for portable compact electronic apparatuses such as mobile phones, notebook computers, and camcorders, and high-capacity rechargeable batteries are widely used as a power source for driving a motor of an electrical bicycle, a scooter, an electric vehicle, and a fork lift.

The rechargeable battery often includes an electrode assembly that is spiral-wound in a jelly roll form by stacking a positive electrode and a negative electrode with a separator interposed therebetween, a case that houses the electrode assembly together with an electrolyte solution, and a cap plate that seals one side opening of the case, wherein an electrode terminal is installed in the cap plate and electrically connected to the electrode assembly.

An electronic device that uses the battery may have a curved surface and the rechargeable battery may also have a curved surface. For example, the rechargeable battery may be formed such that the case is curved on one side. The case can have a concave curved surface portion and a convex curved surface portion.

If the rechargeable battery applied to this case is charged, the concave curved surface portion may not maintain the curved state and may be expanded. That is, as the concave curved surface portion is deformed, an entire thickness of the rechargeable battery, predetermined as an interval from the concave curved surface portion to the convex curved surface portion of the case, may be increased.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

An exemplary embodiment provides a rechargeable battery maintaining a bent state of a case by minimizing a deformation of the case of the bent state.

A rechargeable battery according to an exemplary embodiment includes an electrode assembly; a case receiving the electrode assembly; a cap plate sealing an opening of the case; and an electrode terminal installed to the cap plate and electrically connected to the electrode assembly, wherein the case includes a first curved surface portion bent toward a center of the electrode assembly and a second curved surface portion bent to be far from the center, and a reinforcing member adhered to the first curved surface portion.

The case may be three-dimensionally formed in a first direction, a second direction, and a third direction that intersect with each other, and a plane defined by the first direction and the second direction may be formed to be bent in a curvature radius of the third direction.

The reinforcing member may extend and be adhered in the second direction while having a predetermined width in the first direction.

The reinforcing member may be provided in plural and adhered to be separated according to the first direction.

The reinforcing member may be formed of a metal and adhered to the case made of the metal by welding.

The reinforcing member may be formed of a resin and adhered to the case made of the metal by thermal fusion-bonding and hot melting.

The reinforcing member extends and is adhered in the first direction (a width, an x-axis direction) while having a predetermined width in the second direction (a height, a z-axis direction).

The reinforcing member may be provided in plural and adhered to be separated along the second direction.

The reinforcing members extend and are adhered in directions (an oblique direction) crossing each other in the center of the plane (an xz plane).

The reinforcing member extends and is adhered in a direction crossing the first direction (the width, x-axis direction) and the second direction (the height, z-axis direction) while having a predetermined width in the plane.

The reinforcing members are formed in plural and are adhered to be separated from each other according to a direction (a direction crossing the oblique direction) again crossing the crossing direction.

The reinforcing member is respectively positioned at four corners of the plane (the xz plane) and extends and is adhered in the direction crossing two neighboring sides.

The case is formed to be bent in the curvature radius of the third direction while forming a straight line in the second direction for the plane (the xz plane) defined by the first direction and the second direction.

The case is formed to be bent in the curvature radius of the third direction while forming a straight line in the first direction for the plane (the xz plane) defined by the first direction and the second direction.

The reinforcing member may be bent in a curvature radius of the third direction and adhered to the first curved surface portion.

The reinforcing member may be formed of a mesh and adhered to the plane (the xz plane).

The reinforcing member may be formed of a clad metal. The case may be formed of aluminum, and the clad metal may include an aluminum layer adhered to the case and a reinforcing layer adhered to the aluminum layer.

The reinforcing member may be formed of a laminate or a double-sided adhesive tape and adhered to the plane.

The reinforcing member may be formed of a synthetic resin and is adhered to the plane by a hot melting injection.

A rechargeable battery according to an embodiment includes an electrode assembly; a case that receives the electrode assembly, wherein the case includes first and second curved sides and first and second interconnecting sides that are interposed between the first and second curved sides and wherein the first and second curved sides define a concave and convex surface respectively and wherein the electrode assembly is curved to match the contour of the case; and at least one reinforcing member formed on the first curved surface that inhibits deformation of the concave surface of the first curved side in response to charging and discharging of the electrode assembly.

The first curved surface may define a curved area that extends in a first and second orthogonal direction and wherein the first curved surface is curved inward towards the center of the electrode assembly in a third direction that is orthogonal to the first and second direction.

The case may comprise first and second side surfaces and a top and bottom surface and wherein the at least one reinforcing member comprises a plurality of members.

The plurality of reinforcing members may extend in a first direction between the top and bottom surface of the case.

The plurality of reinforcing members may extend in a second direction between the side surfaces of the case.

The plurality of reinforcing members may cross each other on the first curved surface.

The plurality of reinforcing members may comprise a plurality of crossing members that form a grid with members substantially orthogonal to each other.

The plurality of members may extend diagonally between the top and bottom surfaces of the can.

As described above, according to an exemplary embodiment, by adhering the reinforcing member to the first curved surface portion (the concave curved surface portion) bent toward the center of the electrode assembly in the case, when performing the charge and discharge, the deformation of which the case is swelled by the internal pressure of the rechargeable battery may be minimized. Accordingly, the rechargeable battery may strongly maintain the bent state of the case.

DETAILED DESCRIPTION OF CERTAIN INVENTIVE EMBODIMENTS

Figure 1:
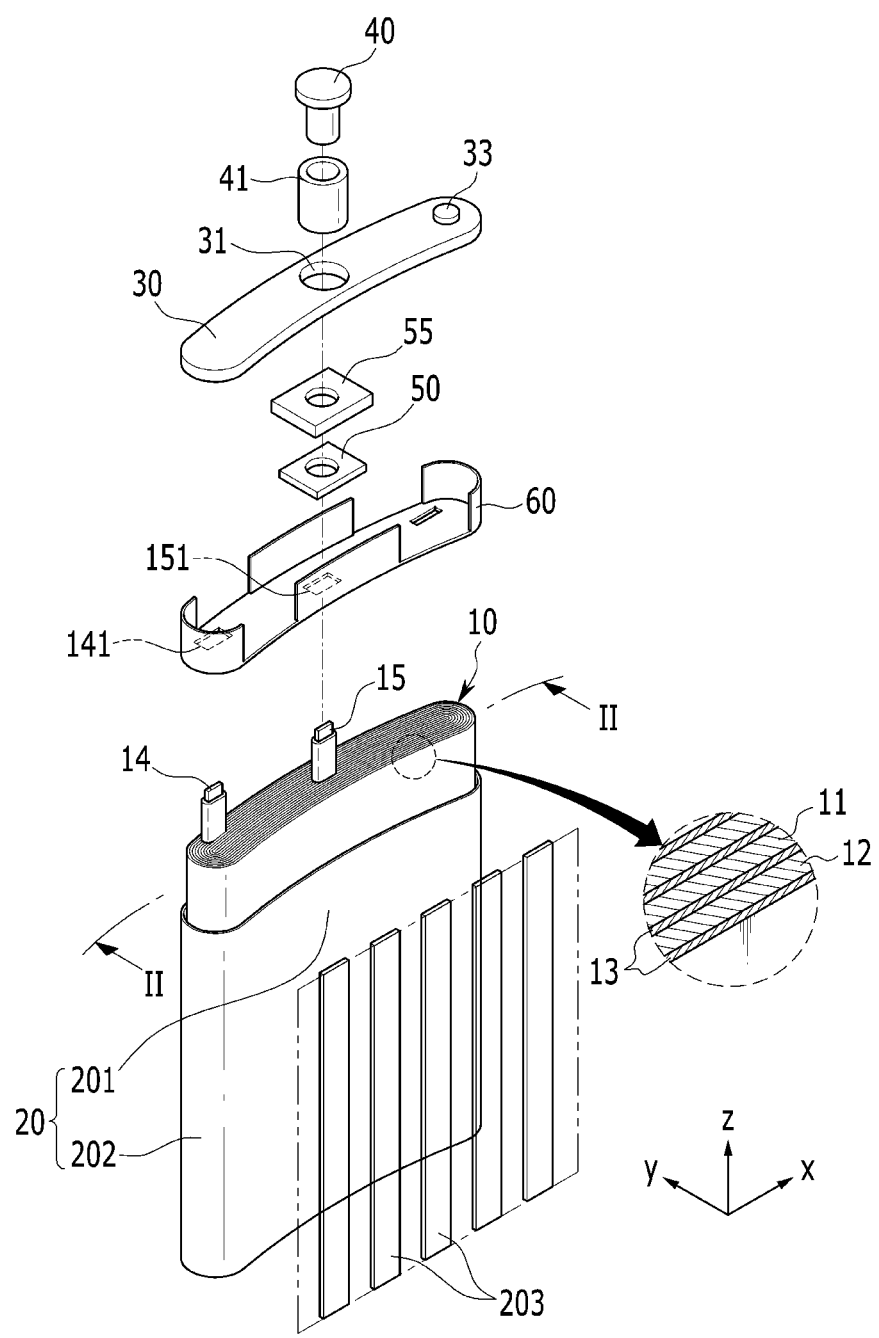
FIG. 1 is an exploded perspective view of a rechargeable battery according to a first exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
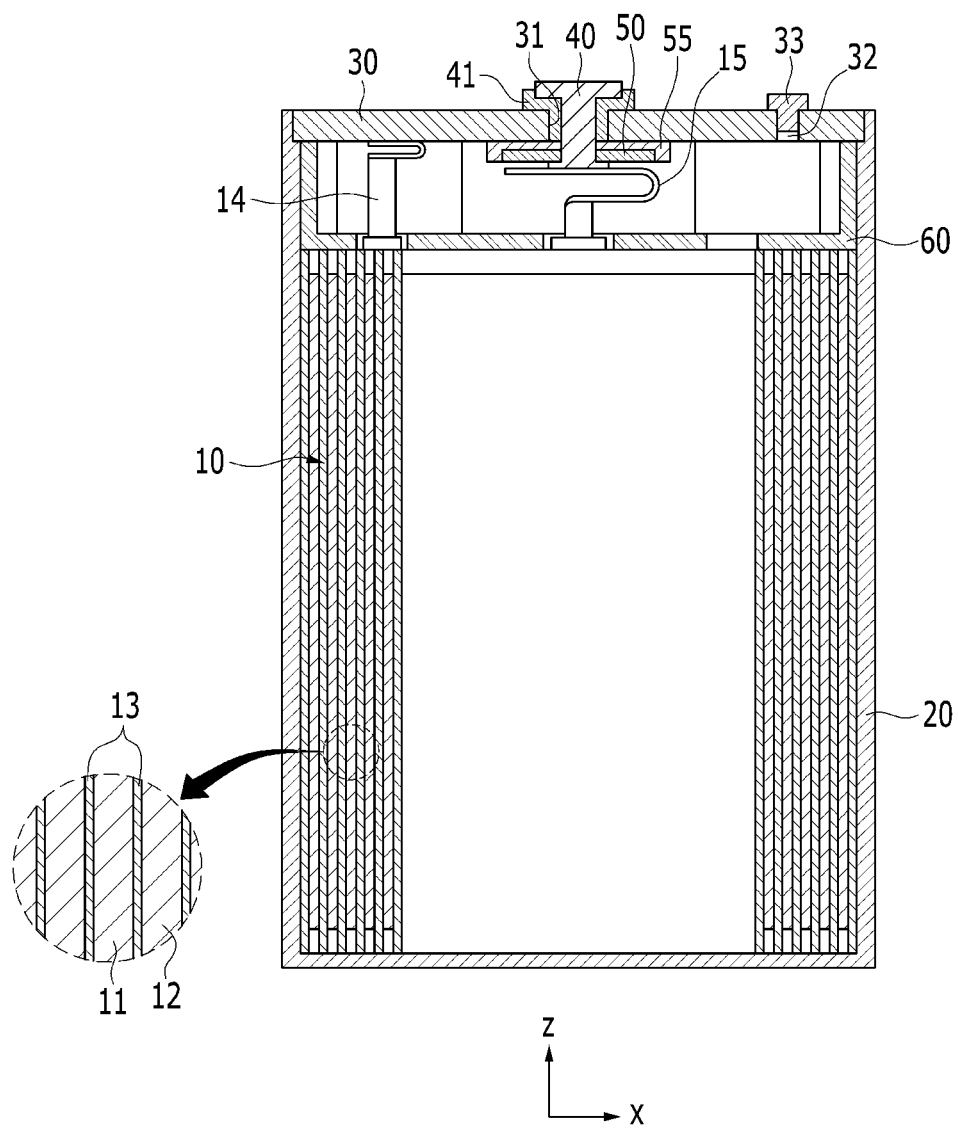
FIG. 2 is a cross-sectional view taken along the line II-II of FIG. 1.

FIG. 1 is an exploded perspective view of a rechargeable battery according to a first exemplary embodiment, and FIG. 2 is a cross-sectional view taken along the line II-II of FIG. 1.

Referring to FIG. 1 and FIG. 2, a rechargeable battery according to the first exemplary embodiment includes an electrode assembly 10 charging and discharging a current, a case 20 receiving the electrode assembly 10 together with an electrolyte solution, a cap plate 30 sealing an upper opening of the case 20, and an electrode terminal 40 provided in a terminal hole 31 of the cap plate 30 and thus electrically connected to the electrode assembly 10.

In addition, the rechargeable battery according to the first exemplary embodiment may further include a terminal plate 50 electrically connecting the electrode terminal 40 to the electrode assembly 10, and an insulation case 60 electrically insulating the electrode assembly 10 and the cap plate 30.

Although not shown, the rechargeable battery may be entirely bent through a bending process after inserting and assembling the electrode assembly in a rectangular case. For convenience, the present exemplary embodiment provides a rechargeable battery in which the case 20 is formed with a bent rectangular shape, the electrode assembly 10 is formed to be bent with a state corresponding to the case 20, and the electrode assembly 10 is inserted in the case 20.

The electrode assembly 10 is formed in a shape that corresponds to an inner space of the bent prismatic case 20 so as to be inserted into the case 20. For example, the case 20 includes a curved surface portion 201 corresponding to the wide curved surface (a xz-plane side) of the electrode assembly 10 and a side surface portion 202 formed at both sides of the curved surface portion 201 and corresponding to a side surface (a yz-plane side) of the electrode assembly 10.

The bent case 20 allows insertion of the bent electrode assembly 10 and the bent insulating case 60 through the opening provided at the upper side and further allows coupling of the bent cap plate 30 to the opening. The bent case 20 receives the inserted electrode assembly 10, and is formed of a conductor to have a function of an electrode terminal. For example, the case 20 can be formed with aluminum or an aluminum alloy.

The electrode assembly 10 is formed by stacking a positive electrode 11 and a negative electrode 12 on respective sides of a separator 13 which is an electrical insulating material, and spirally winding the electrodes 11, 12 and the separator 13. The electrode assembly 10 includes a positive electrode lead tab 14 connected to the positive electrode 11 and a negative electrode lead tab 15 connected to the negative electrode 12.

The positive electrode lead tab 14 is connected to the bottom of the cap plate 30 through welding, and the case 20 is electrically connected to the positive electrode 11 of the electrode assembly 10 through the cap plate 30 to function as a positive electrode terminal.

The negative electrode lead 15 is connected to the bottom of the terminal plate 50 connected to a first end of the electrode end 40 through welding, and the electrode end 40 provided in the terminal hole 31 of the cap plate 30 is electrically connected to the negative electrode 12 of the electrode assembly 10 to function as a negative terminal.

Although not shown, the negative electrode lead tab is connected to the cap plate such that the case may function as the negative terminal, and the positive electrode lead tab is connected to the electrode terminal such that the electrode terminal may function as the positive terminal.

The electrode terminal 40 is inserted into the terminal hole 31 of the cap plate 30 by interposing an insulating gasket 41 therebetween. That is, the insulating gasket 41 electrically insulates the terminal hole 31 and the electrode terminal from each other, and forms a sealing structure between the terminal hole 31 and the electrode terminal 40.

The terminal plate 50 is electrically connected to the electrode terminal 40 with an insulating plate 55 interposed therebetween. That is, the insulating plate 55 electrically insulates the cap plate 30 and the terminal plate 50 from each other, and further forms a sealing structure between the cap plate 30 and the terminal plate 50.

The cap plate 30 also has an electrolyte injection port 32. The electrolyte injection port 32 enables the electrolyte to be injected into the case 20 after the cap plate 30 is coupled with the case 20. After injecting the electrolyte, the electrolyte injection port 32 is sealed by a sealing stopper 33.

The insulating case 60 is bent to correspond to the bent case 20, and is installed between the electrode assembly 10 and the terminal plate 50 inside the case 20 to electrically insulate the electrode assembly 10 and the terminal plate 50 from each other. That is, the insulating case 60 electrically insulates the positive electrode 11 of the electrode assembly 10 and the terminal plate 50 having negative polarity.

In addition, the insulating case 60 has tab holes 141 and 151 penetrating the positive electrode lead tab 14 and the negative electrode lead tab 15, respectively. Therefore, the positive electrode lead tab 14 may be connected to the cap plate 30 while passing through the tab hole 141, and the negative electrode lead tab 15 may be connected to the terminal plate 50 while passing through the tab hole 151.

Figure 3:
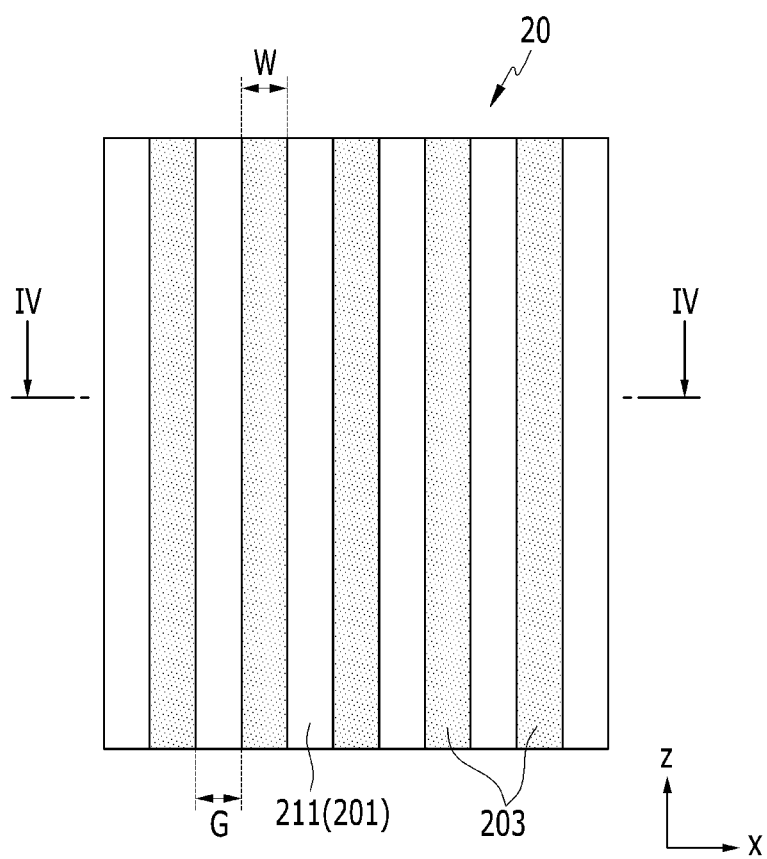
FIG. 3 is a front view of a case used for the rechargeable battery of FIG. 1.
Figure 4:
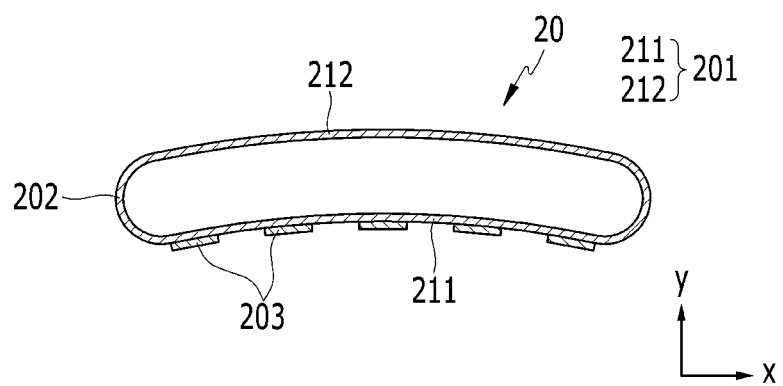
FIG. 4 is a longitudinal cross-sectional view of the case taken along the line IV-IV of FIG. 3.

FIG. 3 is a front view of a case used for the rechargeable battery of FIG. 1, and FIG. 4 is a longitudinal cross-sectional view of the case taken along the line IV-IV of FIG. 3.

Referring to FIG. 3 and FIG. 4, the case 20 includes the curved surface portion 201 in the bent state and a reinforcing member 203 adhered to the curved surface portion 201. The curved surface portion 201 of the case 20 includes a first curved surface portion (hereinafter referred to as "a concave curved surface portion") 211 bent toward the center of the electrode assembly 10, and a second curved surface portion (hereinafter referred to as "a convex curved surface portion") 212 far from the center. That is, with respect to the curvature radius direction in the bent case 20, the concave curved surface portion 211 forms an inner portion and the convex curved surface portion 212 forms an outer portion of a curvature radius.

The reinforcing member 203 is adhered to the concave curved surface portion 211 to reinforce the strength thereof such that the deformation in which the concave curved surface portion 211 is swelled by the internal pressure of the rechargeable battery generated when charging and discharging may be suppressed.

In detail, the case 20 is three-dimensionally formed in a first direction (an x-axis direction or a width direction of the case), a second direction (a z-axis direction or a height direction of the case), and a third direction (a y-axis direction or a thickness direction of the case), and the xz plane defined by the x-axis direction and the z-axis direction is formed of the state that is bent with the curvature radius of the y-axis direction.

The reinforcing member 203 extends in the z-axis direction while having a predetermined width W in the x-axis direction, and is adhered to the concave curved surface portion 211. Also, a plurality of reinforcing members 203 are formed to correspond to the concave curved surface portion 211, and the neighboring reinforcing members 203 may be adhered with the interval G according to the x-axis direction.

For example, the reinforcing member 203 is formed of the metal to be adhered to the concave curved surface portion 211 of the case 20 formed of the metal by the welding. The case 20 and the reinforcing member 203 are formed with the same material, that is, aluminum or an aluminum alloy, when performing the welding, thereby having high adhesion intensity.

Also, the reinforcing member 203 may be formed of a resin, and in this case, it may be adhered to the case 20 formed of the metal by thermal fusion-bonding and hot melting. The reinforcing member 203 formed of the resin may further increase an electrical insulating characteristic in the concave curved surface portion 211 of the case 20 compared with the metal.

That is, the reinforcing member 203 extends and is adhered in the z-axis direction while having the width W and the interval G in the x-axis direction at the concave curved surface portion 211 of the case 20. Accordingly, according to the existence of the reinforcing member 203, the concave curved surface portion 211 has two kinds of strength in the z-axis direction, and also has strength that is increased and decreased in the x-axis direction.

The concave curved surface portion 211 receives a working force to be spread in the bent state by the internal pressure of the rechargeable battery, and in this case, strength distribution determined in the concave curved surface portion 211 by the reinforcing member 203 may suppress the spread working force of the concave curved surface portion 211. Accordingly, the deformation in which the concave curved surface portion 211 of the case 20 is swelled may be prevented or reduced.

Next, various exemplary embodiments will be described. In the following exemplary embodiments, compared with the first exemplary embodiment and the above-described exemplary embodiment, the description of the same elements is omitted, and differences will be described.

Figure 5:
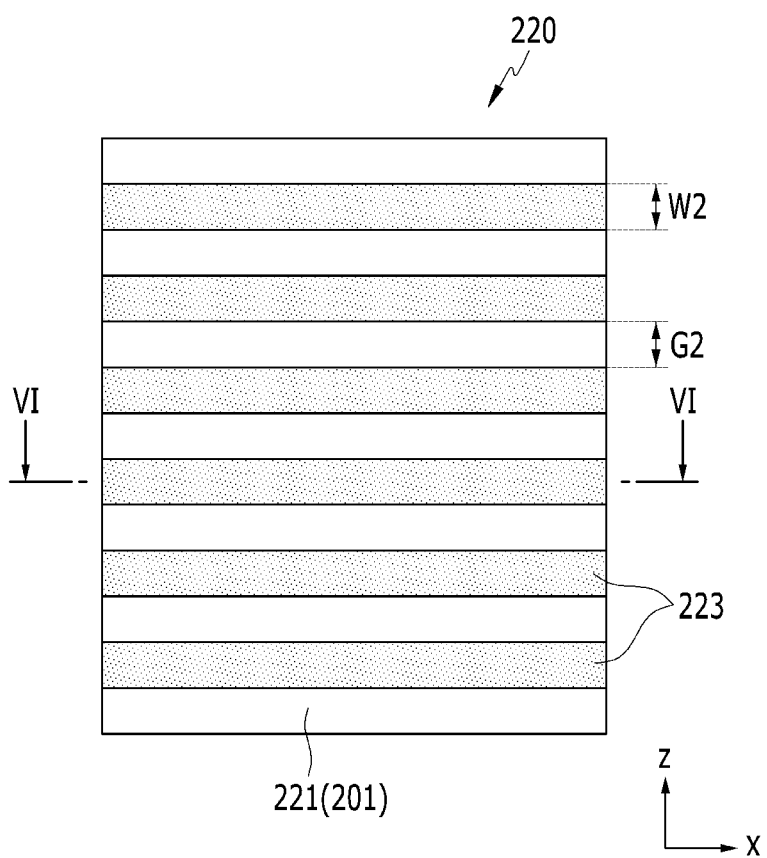
FIG. 5 is a front view of a case used for a rechargeable battery according to a second exemplary embodiment.
Figure 6:
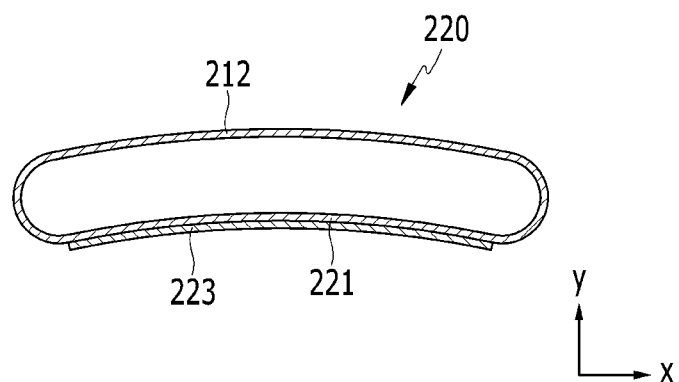
FIG. 6 is a longitudinal cross-sectional view of the case taken along the line VI-VI of FIG. 5.

FIG. 5 is a front view of a case used for a rechargeable battery according to a second exemplary embodiment, and FIG. 6 is a longitudinal cross-sectional view of the case taken along the line VI-VI of FIG. 5. Referring to FIG. 5 and FIG. 6, in the second exemplary embodiment, a reinforcing member 223 of a case 220 extends in the x-axis direction while having the predetermined width W2 in the z-axis direction, and is adhered to a concave curved surface portion 221. Also, the reinforcing member 223 is provided in plural, and may be adhered with the interval G2 according to the z-axis direction.

That is, the reinforcing member 223 extends in the x-axis direction while having the width W2 and the interval G2 in the z-axis direction at the concave curved surface portion 221 of the case 220, and is adhered according to the curvature of the y-axis direction. Accordingly, according to existence of the reinforcing member 223, the concave curved surface portion 221 has two kinds of strength in the x-axis direction, and also has strength that is increased and decreased in the z-axis direction.

The concave curved surface portion 221 receives a working force to be spread in the bent state by the internal pressure of the rechargeable battery, and in this case, strength distribution determined in the concave curved surface portion 221 by the reinforcing member 223 may suppress the spread working force of the concave curved surface portion 221. Accordingly, the deformation in which the concave curved surface portion 221 of the case 220 is swelled may be prevented.

Figure 7:
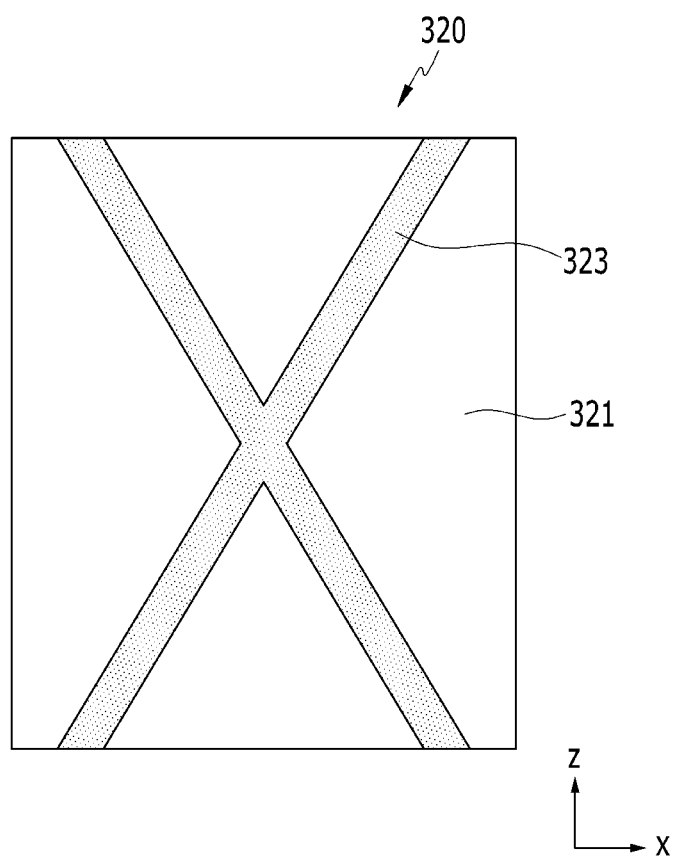
FIG. 7 is a front view of a case used for a rechargeable battery according to a third exemplary embodiment.

FIG. 7 is a front view of a case used for a rechargeable battery according to a third exemplary embodiment. Referring to FIG. 7, in the third exemplary embodiment, a reinforcing member 323 of a case 320 extends in a diagonal direction to be crossed with respect to one position of the xz plane as the center and is adhered according to the curvature of the y-axis direction.

Accordingly, according to existence of the reinforcing member 323, a concave curved surface portion 321 has strength that is increased and decreased in the x-axis and the z-axis direction while being reinforced according to the diagonal direction.

The concave curved surface portion 321 receives a working force to be spread in the bent state by the internal pressure of the rechargeable battery, and in this case, a strength distribution determined in the concave curved surface portion 321 by the reinforcing member 323 may suppress the spread working force of the concave curved surface portion 321. Accordingly, the deformation of which the concave curved surface portion 321 of the case 320 is swelled may be prevented or reduced.

Figure 8:
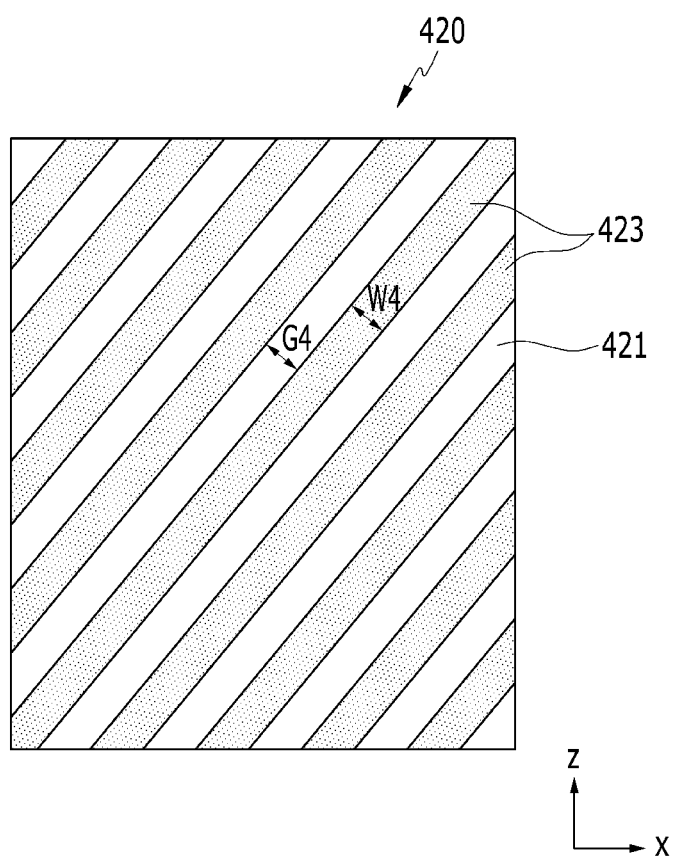
FIG. 8 is a front view of a case used for a rechargeable battery according to a fourth exemplary embodiment.

FIG. 8 is a front view of a case used for a rechargeable battery according to a fourth exemplary embodiment. Referring to FIG. 8, in the fourth exemplary embodiment, a reinforcing member 423 of a case 420 extends in the oblique direction crossing the x-axis direction and the z-axis direction while having the predetermined width W4 in the xz plane, and the reinforcing member 423 is provided in plural and may be adhered according to a direction crossing the oblique direction with the interval G4.

That is, the reinforcing member 423 extends in the oblique direction while having the width W4 and the interval G4 in the direction crossing the oblique line at a concave curved surface portion 421 of the case 420 and is adhered according to the curvature of the y-axis direction. Accordingly, according to existence of the reinforcing member 423, the concave curved surface portion 421 has two kinds of strength in the oblique direction, and also has strength that is increased and decreased in the direction crossing the oblique direction.

The concave curved surface portion 421 receives a working force to be spread in the bent state by the internal pressure of the rechargeable battery, and in this case, a strength distribution determined in the concave curved surface portion 421 by the reinforcing member 423 may suppress the spread working force of the concave curved surface portion 421. Accordingly, the deformation of which the concave curved surface portion 421 of the case 420 is swelled may be prevented or reduced.

Figure 9:
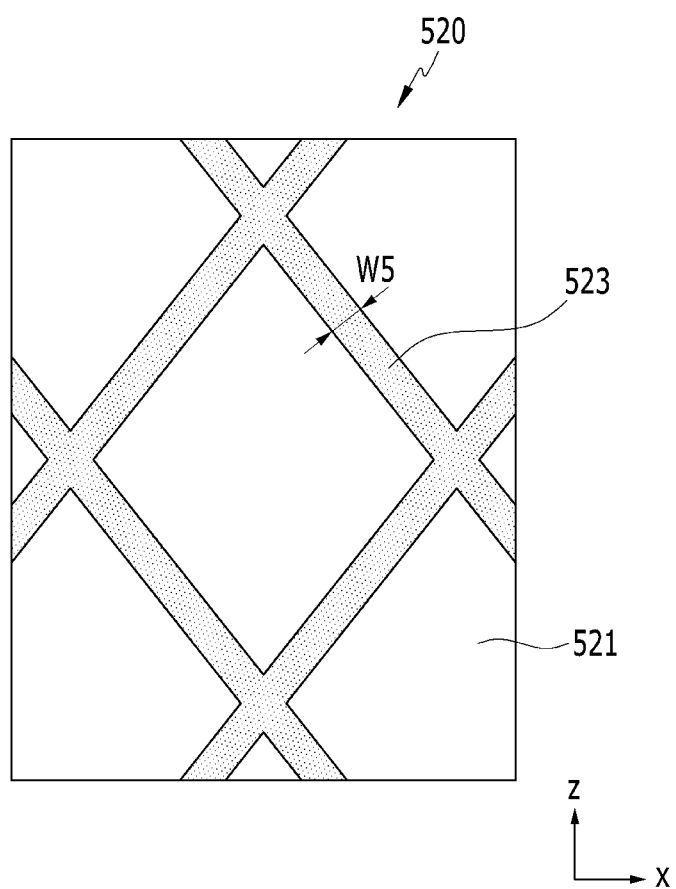
FIG. 9 is a front view of a case used for a rechargeable battery according to a fifth exemplary embodiment.

FIG. 9 is a front view of a case used for a rechargeable battery according to a fifth exemplary embodiment. Referring to FIG. 9, in the fifth exemplary embodiment, a reinforcing member 523 of a case 520 is respectively positioned at four corners of the xz plane and extends and is adhered in the direction crossing the neighboring two sides.

That is, the reinforcing member 523 extends while having the width W5 in the direction crossing two sides at four corners of a concave curved surface portion 521 of the case 520 and is adhered according to the curvature of the y-axis direction.

Accordingly, according to existence of the reinforcing member 523, the concave curved surface portion 521 has strength that is increased and decreased in the x-axis and z-axis direction while being reinforced according to the direction crossing two sides.

The concave curved surface portion 521 receives a working force to be spread in the bent state by the internal pressure of the rechargeable battery, and in this case, a strength distribution determined in the concave curved surface portion 521 by the reinforcing member 523 may suppress the spread working force of the concave curved surface portion 521. Accordingly, the deformation of which the concave curved surface portion 521 of the case 520 is swelled may be prevented or reduced.

Figure 10:
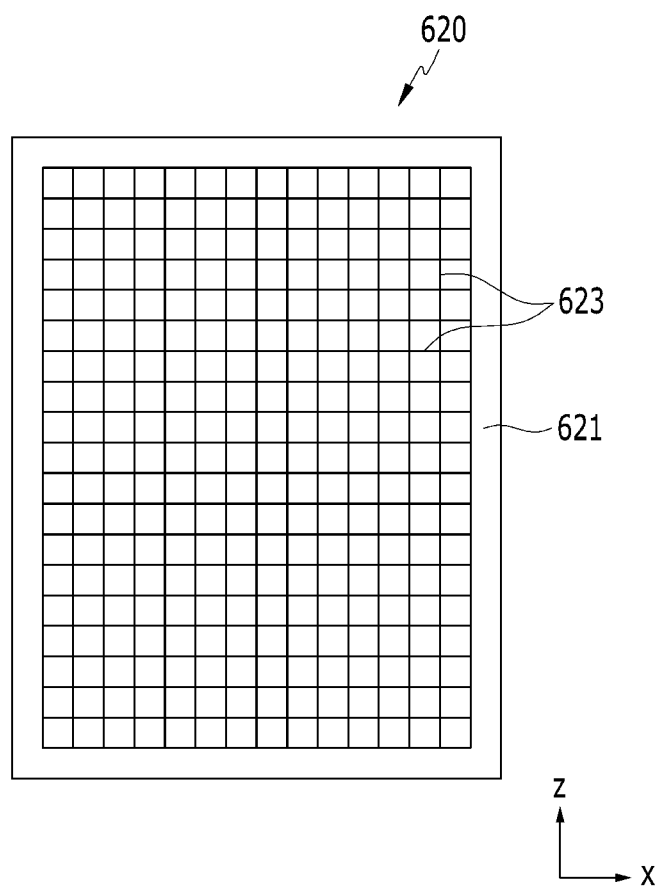
FIG. 10 is a front view of a case used for a rechargeable battery according to a sixth exemplary embodiment.

FIG. 10 is a front view of a case used for a rechargeable battery according to a sixth exemplary embodiment. Referring to FIG. 10, in the sixth exemplary embodiment, a reinforcing member 623 of a case 620 is formed of a mesh and is adhered to the xz plane.

That is, the reinforcing member 623 is disposed in the x-axis and the z-axis direction at a concave curved surface portion 621 of the case 620 and is adhered according to the curvature of the y-axis direction. Accordingly, the concave curved surface portion 621 may have entirely uniform or more uniform strength according to the reinforcing member 623.

Next, a method of adhering the reinforcing member to the concave curved surface portion of the case will be described. The reinforcing members provided in the following exemplary embodiments may be applied as the reinforcing member of the first exemplary embodiment to the sixth exemplary embodiment.

Figure 11:
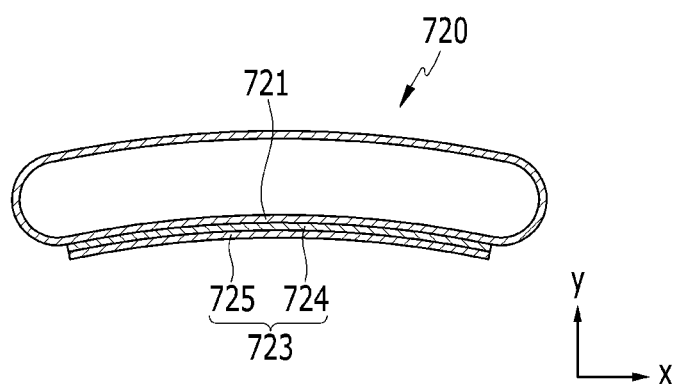
FIG. 11 is a longitudinal cross-sectional view of a case used for a rechargeable battery according to a seventh exemplary embodiment.

FIG. 11 is a longitudinal cross-sectional view of a case used for a rechargeable battery according to a seventh exemplary embodiment. Referring to FIG. 11, in the seventh exemplary embodiment, a reinforcing member 723 of a case 720 may be formed of a clad metal.

When the case 720 is formed of aluminum, the reinforcing member 723 may be formed of an aluminum layer 724 and the clad metal having a reinforcing layer 725. That is, by pressing the clad metal to a concave curved surface portion 721 of the case 720, the reinforcing member 723 is adhered to the concave curved surface portion 721 by the aluminum layer 724 in the state of including the reinforcing layer 725.

The reinforcing member 723, that is, the clad metal, includes the aluminum layer 724 that is the same material as the case 720 thereby being strongly adhered to the concave curved surface portion 721, and the reinforcing layer 725 is separately included such that the strength of the concave curved surface portion 721 may be variously selected.

Figure 12:
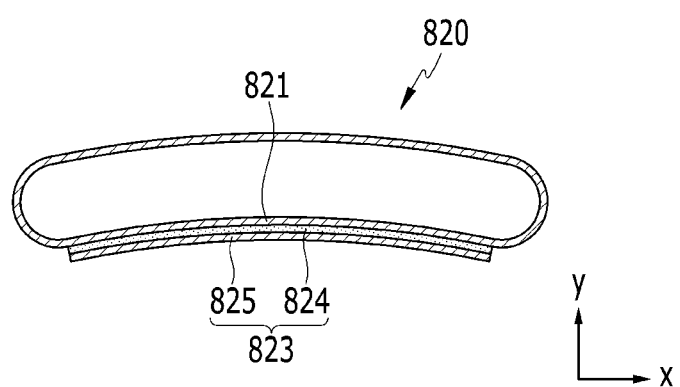
FIG. 12 is a longitudinal cross-sectional view of a case used for a rechargeable battery according to an eight exemplary embodiment.

FIG. 12 is a longitudinal cross-sectional view of a case used for a rechargeable battery according to a seventh exemplary embodiment. Referring to FIG. 12, in the eighth exemplary embodiment, a reinforcing member 823 of a case 820 is formed of a laminate tape including a plurality of metal layers or a double-sided adhesive tape, and is adhered to the xz plane.

That is, the reinforcing member 823 includes an adhesive layer 824 and a reinforcing layer 825. Through the laminate or the double-sided adhesive tape, the reinforcing member 823 may be easily adhered to a concave curved surface portion 821 of the case 820.

Figure 13:
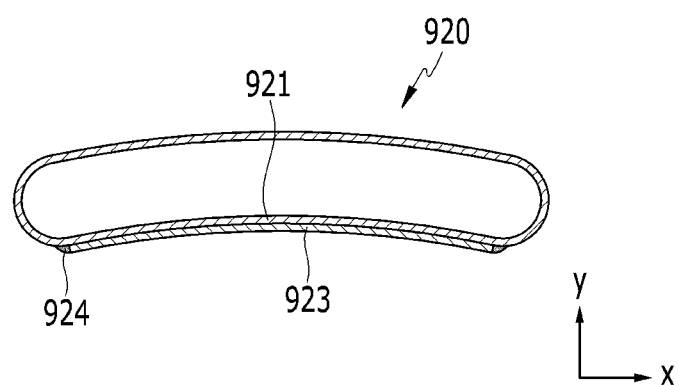
FIG. 13 is a longitudinal cross-sectional view of a case used for a rechargeable battery according to a ninth exemplary embodiment.

FIG. 13 is a longitudinal cross-sectional view of a case used for a rechargeable battery according to a ninth exemplary embodiment. Referring to FIG. 13, in the ninth exemplary embodiment, a reinforcing member 923 of a case 920 is formed of synthetic resins to be adhered to the xz plane by hot melting injection. That is, if the case 920 and the reinforcing member 923 are simultaneously injected by the hot melting, the reinforcing member 923 is adhered to a concave curved surface portion 921 of the case 920 at both ends 924 of the x-axis direction.

Figure 14:
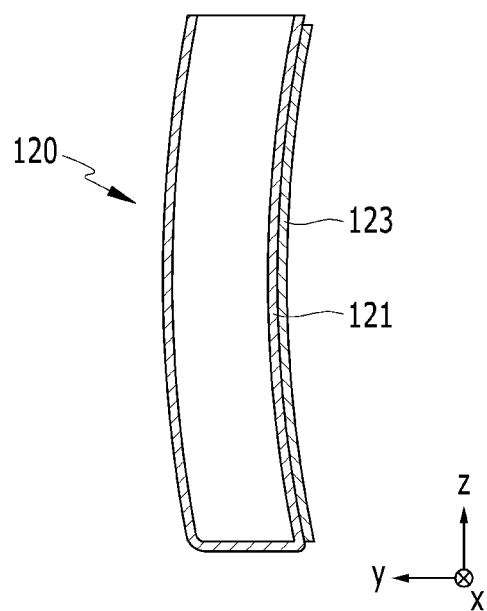
FIG. 14 is a longitudinal cross-sectional view of a case used for a rechargeable battery according to a tenth exemplary embodiment.

FIG. 14 is a longitudinal cross-sectional view of a case used for a rechargeable battery according to a tenth exemplary embodiment. Referring to FIG. 14, the case 120 of the tenth exemplary embodiment is formed to be bent in the curvature radius of the y-axis direction while forming a straight line in the x-axis direction for the xz plane. That is, the case 120 is formed of a structure that is bent in an up/down direction in FIG. 14.

In the first to ninth exemplary embodiment, the cases 20, 220, 320, 420, 520, 620, 720, 820, and 920 are formed for the xz plane to be bent in the curvature radius of the y-axis direction while forming the straight line in the z-axis direction. That is, the cases 20, 220, 320, 420, 520, 620, 720, 820, and 920 have the structure that is bent in the right/left direction in each drawing.

That is, the cases 20, 220, 320, 420, 520, 620, 720, 820, 920, and 120 of the rechargeable battery may be bent in the up/down direction and the right/left direction.

Also, in the tenth exemplary embodiment, a reinforcing member 123 is bent in the curvature radius of the y-axis direction and is adhered to a concave curved surface portion 121. That is, the reinforcing members 203, 223, 323, 423, 523, 623, 723, 823, and 923 of the first to ninth exemplary embodiments are bent according to the bent direction of the case 120 of the tenth exemplary embodiment to be applied to the concave curved surface portion 121 of the case 120.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly;
   a case receiving the electrode assembly;
   a cap plate sealing an opening of the case; and
   an electrode terminal installed to the cap plate and electrically connected to the electrode assembly,
   wherein the case includes
   a first curved surface portion bent toward a center of the electrode assembly and a second curved surface portion bent to be far from the center, and
   a reinforcing member comprised of a plurality of discrete members adhered to the first curved surface portion so that the first curved surface portion is reinforced against deformation in the direction of the reinforcing member and wherein the plurality of discrete members have portions that are spaced apart so that the second curved surface portion is exposed between adjacent discrete members.

2. The rechargeable battery of claim 1, wherein
   the case is three-dimensionally formed in a first direction, a second direction, and a third direction that intersect with each other, and a plane defined by the first direction and the second direction is formed to be bent in a curvature radius of the third direction.

3. The rechargeable battery of claim 2, wherein
   the reinforcing member extends and is adhered in the second direction while having a predetermined width in the first direction.

4. The rechargeable battery of claim 3, wherein
   the reinforcing member is provided in plural and adhered to be separated according to the first direction.

5. The rechargeable battery of claim 4, wherein
   the reinforcing member is formed of a metal and is adhered to the case made of the metal by welding.

6. The rechargeable battery of claim 4, wherein
   the reinforcing member is formed of a resin and is adhered to the case made of the metal by thermal fusion-bonding and hot melting.

7. The rechargeable battery of claim 2, wherein
   the reinforcing member extends and is adhered in the first direction while having a predetermined width in the second direction.

8. The rechargeable battery of claim 7, wherein
   the reinforcing member is provided in plural and adhered to be separated along the second direction.

9. The rechargeable battery of claim 2, wherein
   the reinforcing member comprises a plurality of reinforcing members that extend and are adhered in directions crossing each other in the center of the plane.

10. The rechargeable battery of claim 2, wherein
    the reinforcing member extends and is adhered in a direction crossing the first direction and the second direction while having a predetermined width in the plane.

11. The rechargeable battery of claim 10, wherein
    the reinforcing member is formed in plural and are adhered to be separated from each other wherein the reinforcing members extend in a first and second direction that cross with each other and cross the first and second directions.

12. The rechargeable battery of claim 2, wherein
    the reinforcing member is respectively positioned at four corners of the plane, and extends and is adhered in the direction crossing two neighboring sides.

13. The rechargeable battery of claim 2, wherein
    the reinforcing member is formed of a mesh and is adhered to the plane.

14. The rechargeable battery of claim 2, wherein
    the case is formed to be bent in the curvature radius of the third direction while forming a straight line in the second direction for the plane defined by the first direction and the second direction.

15. The rechargeable battery of claim 2, wherein
    the case is formed to be bent in the curvature radius of the third direction while forming a straight line in the first direction for the plane defined by the first direction and the second direction.

16. The rechargeable battery of claim 15, wherein
    the reinforcing member is bent in a curvature radius of the third direction and is adhered to the first curved surface portion.

17. The rechargeable battery of claim 1, wherein
    the reinforcing member is formed of a clad metal.

18. The rechargeable battery of claim 17, wherein
    the case is formed of aluminum, and the clad metal includes
an aluminum layer adhered to the case and
a reinforcing layer adhered to the aluminum layer.
19. The rechargeable battery of claim 1, wherein
the reinforcing member is formed of a laminate or a double-sided adhesive tape, and is adhered to the plane.
20. The rechargeable battery of claim 1, wherein
the reinforcing member is formed of a synthetic resin and is adhered to the plane by hot melting injection.

* * * * *